June 15, 1926.
A. B. BURT
1,588,937
STEERING WHEEL AUTOMOBILE LOCK
Filed August 18, 1921
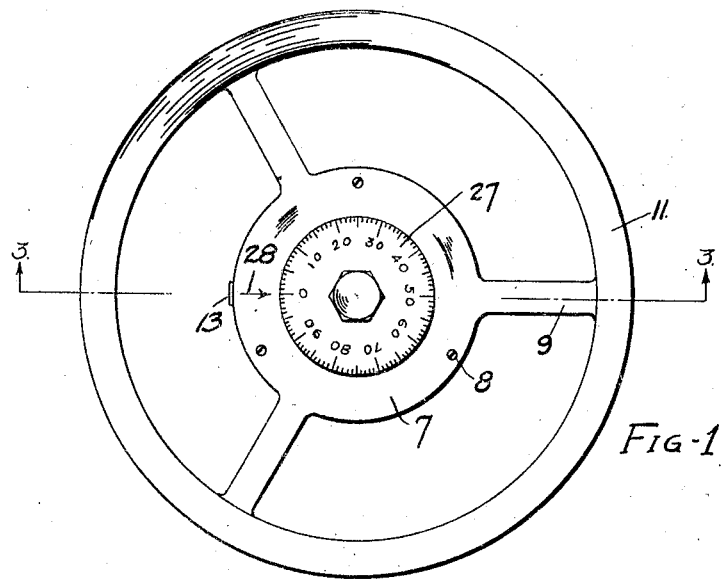
FIG-1-
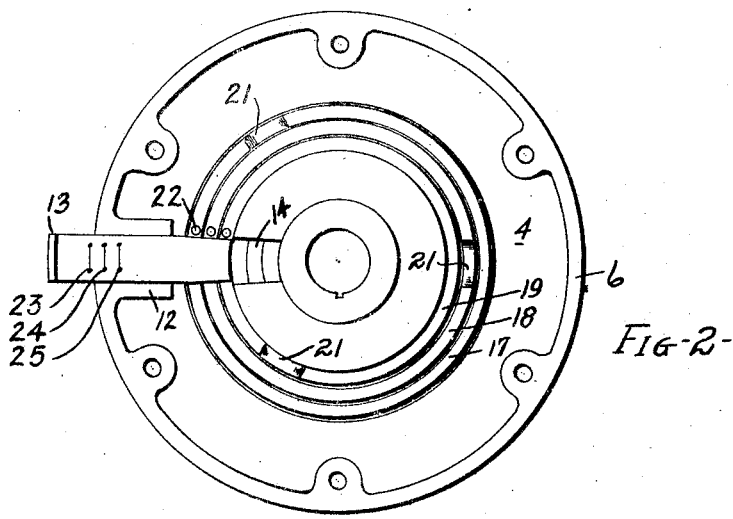
FIG-2-
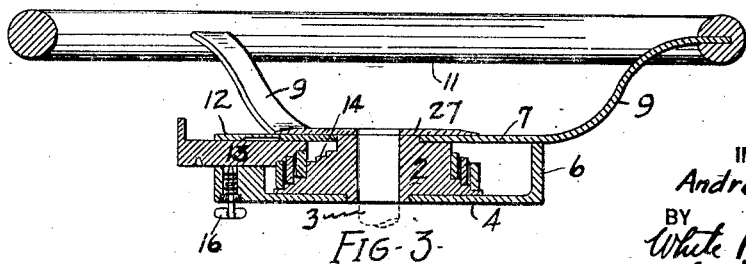
FIG-3-
INVENTOR
Andrew B. Burt
BY White Prost + Evans
his ATTORNEYS Patented June 15, 1926.

1,588,937

UNITED STATES PATENT OFFICE.

ANDREW B. BURT, OF MILL VALLEY, CALIFORNIA.

STEERING-WHEEL AUTOMOBILE LOCK.

Application filed August 18, 1921. Serial No. 493,286.

My invention relates to locks for automobiles and especially to locks incorporated in the steering wheels.

One of the objects of the invention is to provide a steering wheel which may be locked out of engagement with the steering post so that the automobile cannot be operated, the device thus constituting an effective means for preventing theft or unauthorized use of the car. At the same time my device does not prevent the movement of the car by hand for short distances thus complying with various city ordinances and underwriter's rules.

Another object of the invention is the provision of a device of the character described in which the locking means is of the combination type. This feature is of very great importance in view of the fact that practically all key operated locks may be readily picked or otherwise opened.

The invention possesses other objects and features of advantage, some of which, with the foregoing, will be set forth in the following description of my invention. It is to be understood that I do not limit myself to the showing made by the said description, as I may adopt variant forms of my invention as set forth in the claims.

Referring to the drawings, Fig. 1 is a plan view of my steering wheel. Fig. 2 is a plan view of the hub of the wheel with the dial and cover plate removed. Fig. 3 is a sectional view thru the steering wheel. The plane of section is indicated by the line 3—3 of Fig. 1.

In general terms the device of my invention comprises a steering wheel rim rotatably mounted upon a collar which is fixed to the steering rod of the automobile. Means are provided for connecting the rim for rotation with the collar, and means including a combination lock are also provided for preventing the operative movement of the connecting means. When the connecting means is disengaged the rim may be freely rotated on the collar so that the steering wheel is inoperative. Before the connecting means can be removed to connect the rim for rotation with the collar the combination for setting the lock must be known and the tumblers of the lock moved accordingly. The connecting means may then be operated to lock the rim to the collar so that the steering wheel is operative.

More particularly my device comprises a collar 2 rigidly fixed upon the upper end of the steering rod 3. A hub comprising the bottom plate 4 with flange 6 and top plate 7 is rotatably mounted upon the collar 2. Suitable screws 8 secure the top plate 7 to the flange 6, and arms 9 preferably integrally formed with the top plate 7 form a spider upon which the rim 11 of the steering wheel is secured.

The flange 6 is formed with a boss 12 in which a bolt 13 is slidably mounted to move in a radial direction. The inner end of the bolt is preferably tapered as shown in Fig. 2 and stepped as shown in Fig. 3, and the collar 2 is provided with a correspondingly tapered and stepped socket 14 in which the end of the bolt may be seated. When so positioned the bolt connects the rim of the steering wheel for rotation with the collar and steering rod. A spring-held taper pin latch 16 arranged below the bolt provides means for positively holding the bolt in the operative or engaged position. This latch must be drawn down to permit withdrawal of the bolt.

Means are provided for locking the bolt in the inoperative or disconnected position. Arranged on the collar 2 and concentric with the axis thereof, are a plurality of tumbler rings 17, 18 and 19, arranged as shown in Figs. 2 and 3. There are preferably three of the tumbler rings and when the bolt is in the position shown in Fig. 3 the rings lie contiguous to the stepped end of the bolt and as shown prevent inward or operative movement thereof. Each ring is however provided with a recess 21 and when these recesses are alined with the bolt, the bolt may be pushed inwardly to its socket 14 in the collar.

Means are provided for moving the tumbler rings by means of the rim 11. Fixed in the upper part of each ring is a pin 22, and gauge lines 23, 24 and 25 are marked on the upper surface of the bolt and are adapted to be registered with the edge of the hub. When the bolt is withdrawn so that gauge line 23 is alined with the edge of the hub all of pins 22 may be engaged by the bolt. If the bolt is still further withdrawn so that gauge line 24 is alined with the edge of the hub, only the two other pins 22 are engaged by the bolt. If the gauge line 25 is alined with the edge of the hub the bolt is capable of engaging only the outer pin 22. Thus in accordance with the position of the bolt the tumbler rings, 17, 18 and 19 may be individually or collectively moved by rotation of the rim after the bolt has been withdrawn to free the wheel from the steering rod. Means are provided for indicating the position of the tumbler rings so that they may be turned to aline the recesses 21 with the bolt to permit unlocking of the steering wheel or to misaline the recesses 21 to permit locking of the steering wheel, it being understood that the steering wheel is locked when it is free to rotate on the steering rod. Fixed on the collar 2 is a graduated dial 27. An arrow 28 is marked opposite the edge of the dial upon the top plate 7 of the hub. The recesses 21 are so placed with reference to the pins 22 that when the arrow on the hub is successively moved into alinement with certain selected numbers on the dial, the recesses are all alined with the bolt. Different combinations are effected by varying the relationship between the position of the recesses and pins, and the dial numbers.

Operation: If it is desired to lock the car, the latch 16 is drawn downwardly and the bolt 13 withdrawn so that the gauge line 23 registers with the edge of the hub. The rim is then given a turn to the right to mix up the combination, the bolt engaging the pins 22 and carrying the tumbler rings around so that the recesses are no longer in alinement. In this position of the tumbler rings the bolt cannot be re-engaged with the collar and the car is incapable of being steered.

Assume that the combination of the lock is 22—47—83. To unlock the car, that is to connect the rim of the steering wheel for rotation with the collar, the bolt is moved if necessary to register the line 23 with the edge of the hub. The wheel is then given one complete turn to the right to enable the bolt to pick up all of the pins 22, the parts then lying in the position shown in Fig. 2. The wheel is now turned to the right to aline the arrow with the graduation 22. This brings the aperture in the ring 19 in alinement with the final position of the bolt and directly under the zero marking of the dial. The bolt is next withdrawn to register the line 24 with the edge of the hub and the wheel turned once more to the right to aline the arrow with the graduation 47. This alines the recess in the ring 18 with the recess in the ring 19. The bolt is then withdrawn to register the line 25 with the edge of the hub and the rim turned again to the right to register the arrow with the graduation 83. This alines the outer ring 17. The bolt is then fully withdrawn against the limiting stops and the wheel turned in either direction to aline the arrow with the zero graduation. The bolt may now be seated in its socket in the collar where it is held against accidental disengagement by the spring-pressed pin 16.

I claim:

1. An automobile steering wheel comprising a collar adapted for rigid connection to the steering rod, a hand rim rotatably mounted on said collar, a radially movable bolt for connecting said rim for rotation with said collar and mounted for movement with said rim, tumbler rings one within the other and normally free of said bolt and having recesses therein adapted when in alinement to permit radial movement of said bolt, and means on said tumbler rings engageable by said bolt when the rim is rotated whereby said rings may be moved to aline said recesses.

2. An automobile steering wheel comprising a collar adapted for rigid connection to the steering rod, a hand rim rotatably mounted on said collar, a radially movable bolt for connecting said rim for rotation with said collar and mounted for movement with said rim, tumbler rings normally free of said bolt for preventing operative movement of said bolt, and means on said tumbler rings engageable by said bolt separately and collectively whereby said rings may be moved to permit operative movement of said bolt.

In testimony whereof, I have hereunto set my hand.

ANDREW B. BURT.